United States Patent [19]

Dirks et al.

[11] 3,763,473

[45] Oct. 2, 1973

[54] MULTIPORT DATA STORAGE TRANSFER SYSTEM

[75] Inventors: Gerhard H. Dirks, Los Altos Hills; Paul F. Schenck, Mountain View, both of Calif.

[73] Assignee: Dirks Electronics Corporation, Sunnyvale, Calif.

[22] Filed: July 6, 1971

[21] Appl. No.: 159,982

[52] U.S. Cl. .......... 340/172.5
[51] Int. Cl. .......... G06f 3/00, G06f 13/04
[58] Field of Search .......... 340/172.5

[56] References Cited

UNITED STATES PATENTS

| | | | |
|---|---|---|---|
| 3,274,561 | 9/1966 | Hallman | 340/172.5 |
| 3,241,120 | 3/1966 | Amdahl | 340/172.5 |
| 2,988,735 | 6/1961 | Everett | 340/172.5 X |
| 3,200,380 | 8/1965 | MacDonald | 340/172.5 |
| 3,274,554 | 9/1966 | Hopper | 340/172.5 |
| 3,480,931 | 11/1969 | Geissler | 340/182.5 X |
| 3,400,376 | 9/1968 | McDonnell | 340/172.5 |
| 3,593,302 | 7/1971 | Saito | 340/172.5 |

*Primary Examiner*—Paul J. Henon
*Assistant Examiner*—Sydney R. Chirlin
*Attorney*—Louis Bernat

[57] ABSTRACT

A storage device to serve as a temporary or buffer storage includes a plurality of different memory locations, data entering and data sensing devices and associated equipment permitting the individual and independent addressing of each storage location. A first set of switching circuits interrelate certain data entering and data reading devices with the storage device and a further set of switching circuits interrelate other groups of data entering and reading devices to the storage device, all of which switching circuits are individually controllable such that the associated entering and reading devices can be individually and independently placed in an active state at different or the same times. Individual terminals or ports are also provided interconnecting the various switching circuits with peripheral equipment, e.g., CRT displays, magnetic tape, and data processing equipment.

29 Claims, 7 Drawing Figures

INVENTORS
GERHARD H. DIRKS
PAUL F. SCHENCK

BY

INVENTORS
GERHARD H. DIRKS
PAUL F. SCHENCK
BY

INVENTORS
GERHARD H. DIRKS
PAUL F. SCHENCK

BY

Patented Oct. 2, 1973 3,763,473

7 Sheets-Sheet 4

INVENTORS
GERHARD H. DIRKS
PAUL F. SCHENCK

BY

Patented Oct. 2, 1973 3,763,473

7 Sheets-Sheet 5

INVENTORS
GERHARD H. DIRKS
PAUL F. SCHENCK

BY

INVENTORS
GERHARD H. DIRKS
PAUL F. SCHENCK
BY [signature]

INVENTORS
GERHARD H. DIRKS
PAUL F. SCHENCK
BY

MULTIPORT DATA STORAGE TRANSFER SYSTEM

The present invention relates generally to data storage transfer systems, and, more particularly, to a multiport storage transfer system having a plurality of independently and individually addressable transfer storage locations.

BACKGROUND OF THE INVENTION

In data processing, the transfer of data from and to mass and working storage locations determines overall system processing capability. The dependency of performance upon transfer capability becomes more marked with the increase in the number and kind of auxiliary or peripheral equipment interconnected with the system and from which operation of the system is initiated. Such operation can include data retrieval from mass storage, processing of data or entering data in a file, for example. Not infrequently, simultaneous commands are made on the system for simultaneous or concurrent transference of data.

Present known systems solve concurrent requests for data transfer by timesharing transfer channels which requires channel switching means, program instructions to control the switching means for storing program instruction and control for the storage locations. In addition, all operational steps have to be coordinated by the system. Hardware and software for these known systems represent a very complex arrangement which is difficult to set-up and requires personnel having good knowledge of the system as well as an exceptionally high level of skill to make any change in or upgrade an existing system.

More particularly, the two general methods of data entry presently used are entry via keyboard onto punched or magnetic tape or punched cards and entry directly into a processor using timesharing techniques. Both approaches use temporary storage: in the first case, the tape or cards, and in the second case, the processor main frame memory. In either case, the time for throughput of data and report generation, as well as equipment cost and complexity of programming, leave much to be desired. Specifically, in connection with data entry devices that utilize a data processor main frame memory for temporary storage, this interrupts the processor operation, occupies valuable storage space and requires programming to handle the data entry and verification, all of which add to the ultimate expense of the system.

In business data processing, it is necessary for a system to have access to any location which may contribute data to it. That is, flexible structure of management has to be complemented by a flexible data processing system. Known present-day systems require considerable changes in software each time the structure and arrangement of peripheral equipment is changed, due primarily to the fact that all peripherals are supervised in their operation by the central computer with data transfer from and to these peripherals being directed through the main frame memory. Past and present efforts by others to ease data exchange between mass memory and peripherals have been in the direction of complex communication processors, or in the development of programs permitting the use of existing computers as communication processors.

Furthermore, modern business administration to be effective must have records which are current and this, in turn, requires means for rapidly updating its records. This necessitates two facilities: data entry equipment at location of data generation; and data retrieval equipment located where decisions are made. Known systems are deficient in one or more of the following.

1. Many prior systems are not constructed to operate efficiently in an instant update mode, and instead make all mass data entries via tape or punched cards.
2. Those systems which can operate in instant update mode are relatively expensive, and also have a restricted data acceptance rate.
3. To provide a plurality of data retrieval terminals with direct access to data banks in present day equipment requires complex hardware known as communication processors for controlling data flow. Changes in the system, such as expanding the number of retrieval terminals, necessitates changing the program for the communication processor.

OBJECTS AND SUMMARY OF THE INVENTION

It is a primary object of the present invention to provide an improved data storage transfer system having a plurality of independently and individually addressable transfer storage areas.

It is a further object to provide a data storage transfer system having the capability of individual and independent random access to each transfer storage location.

A further object is the provision of a system as in the above objects in which simultaneous random access is available to any or all of a plurality of different storage locations.

Another object is a simplified system having multiple independent data transfer paths between the storage locations and associated equipment.

A still further object is provision of a system not requiring program control for simultaneous transfer between storage areas and associated equipment.

Yet another object is the provision of a system as described in the preceding objects offering optimal flexibility in selection of the kind, number and arrangement of data input/output and handling equipment.

In accordance with the practice of this invention, a data storage transfer system is provided having a main memory serving as a temporary or buffer storage which includes a plurality of different memory locations, and associated equipment permitting the individual and independent addressing of the locations. A first set of switching means interrelate certain data entering and data reading devices with the main memory. A further set of switching means interrelate other groups of data entering and reading devices. All of the switching means are individually controllable such that the associated entering and reading devices can be individually and independently placed in an active state at different or the same times. Means are also provided interconnecting the various switching means with peripheral equipment, e.g., CRT displays, magnetic tape, and data processing equipment.

DESCRIPTION OF A PREFERRED EMBODIMENT

Figure 1:
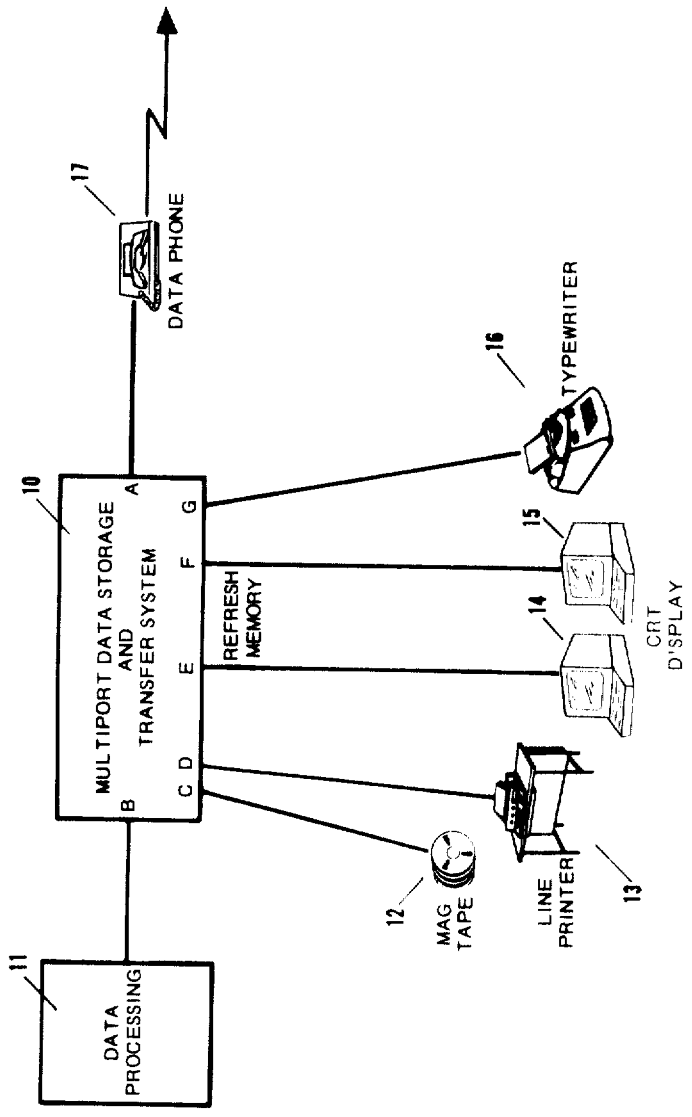
FIG. 1 is a schematic depiction of different kinds of auxiliary or peripheral euipment interrelated with the storage transfer system of this invention.

With reference now to the drawings and particularly to FIG. 1, the system of this invention is shown interconnected with a number of different kinds of auxiliary or peripheral equipment. It is to be understood that the number and kind of such peripheral equipment shown in the drawing and described herein are merely illustrative and are not intended to be limitative in this regard. As shown there, the storage transfer system of the invention is generally enumerated as at 10 and more particularly identified as Multiport Data Storage and Transfer System. The peripheral equipment interconnected with the system, and thereby interrelated to one another, may include a data processor 11, magnetic tape files 12, a line printer 13, a pair of cathode ray display units 14 and 15, a character printer or typewriter 16 and a data link such as a telephone system or so-called modem 17.

As will be more particularly described, the various peripheral equipment items are provided buffer storage and transfer channels by and between each other either on a simultaneous or time spaced manner through the storage transfer system 10. That is, a plurality of different operations can be simultaneously accomplished with data read into and out of the main memory of the system 10 and all at the same time without recourse to time sharing being necessary.

The various interfacing ports for the different peripheral equipment items are further identified in FIG. 1 by the letters A. B. C. - - - . Thus, all data transfers from and to the system 10 via the phone link 17 are handled by port A which has accessibility to all system storage areas requiring communication. Similarly, the data processor 11 is handled by port B, the magnetic tape apparatus 12 by port C, and so forth for all the peripherals.

Figure 2:
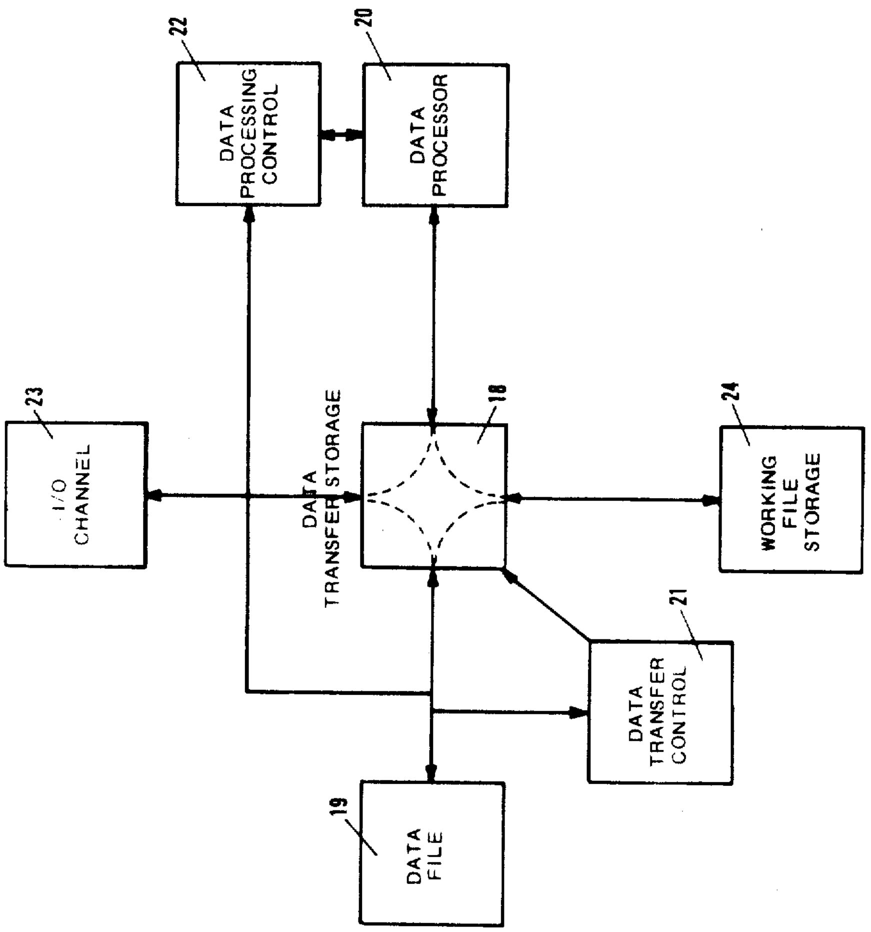
FIG. 2 is a schematic function block diagram of the major elements of the system of this invention.

Turning to FIG. 2, there is shown there a basic block diagram of an arrangement using a multiport memory or data transfer storage 18 as a data buffer or temporary storage means interconnected with various external equipment. A data file 19 is a memory, such as a magnetic disk file for example, which stores all data and program information necessary for controlling data storage 18 and the data processor 20.

Program information is transferred to the data processing control 22 directly from 19 whereas data is exchanged from the file 19 through data transfer storage 18 with peripheral equipment via the input/output (I/O) channels 23 and a further storage means termed the working file storage 24. Similarly, the data processor 20 can exchange data with any of the devices connected via the I/O channel 23 and with the working file storage 24 through data transfer storage 18. The data processor 20 is controlled by data processing control 22 with all transfers through data transfer storage 18 being under the supervision of data transfer control 21.

The arrangement of FIG. 2 described immediately above provides one set of independent storage locations in the storage 18 for each peripheral device connected through the I/O channels 23, and several sets of independent storage locations for the data processor 20 to separate data to be processed from that data already processed. Other storage locations in 18 operate as temporary storage during data transfer from and to the data file 19. As will be more particularly described hereinbelow, each of the storage locations in the data transfer storage 18 can be read into or out of independently of all the other locations, thereby providing for simultaneous access to a plurality of different storage locations not requiring the multiplex techniques used in certain prior systems or complex programming involved in certain other system.

Figure 3:
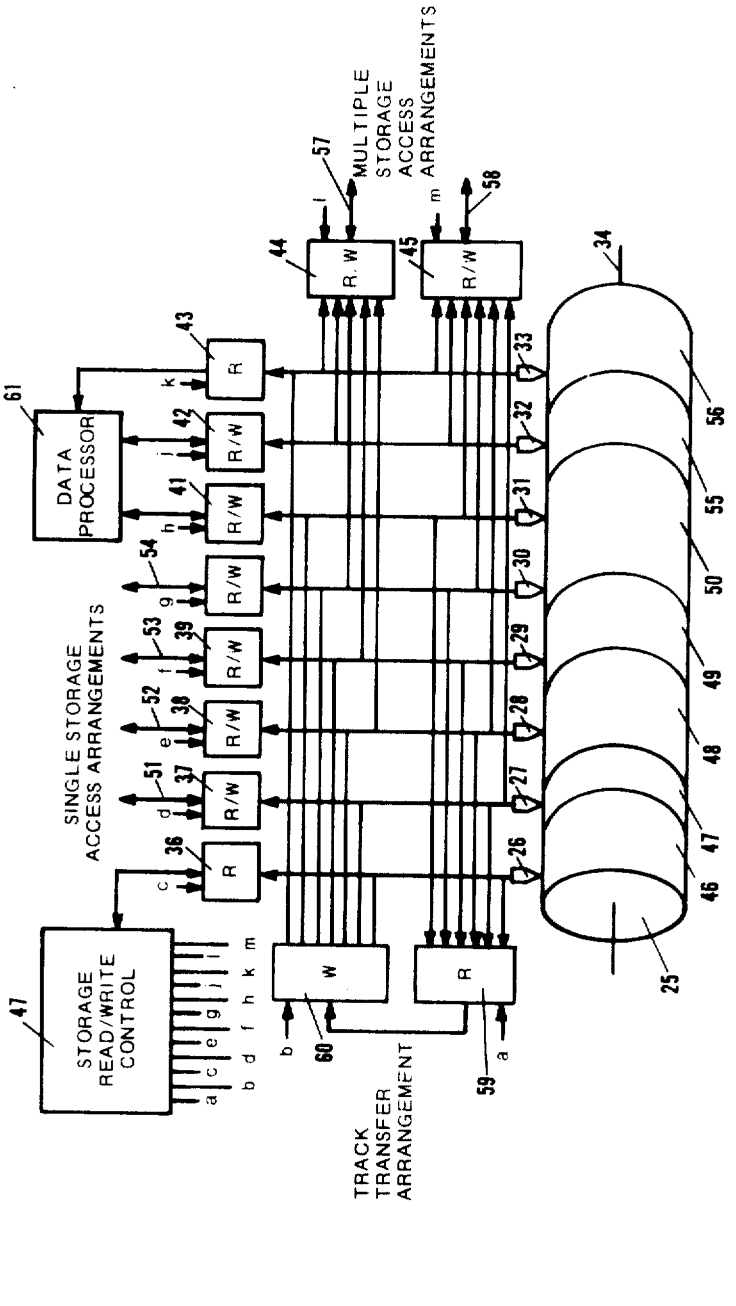
FIG. 3 is a stylized depiction of the system showing utilization of a drum memory as the main frame memory.

FIG. 3 illustrates in somewhat more detail the system of this invention utilizing a rotating magnetic drum memory 25 as the data transfer storage 18. Typically, the drum memory includes a cylindrical body having a magnetizable coating on its circumferential periphery. A plurality of signal recording and sensing heads 26–33 are fixedly mounted closely adjacent the magnetizable surface of the drum, with each head operating on a single circular track of the drum periphery as the drum is rotated about its axis 34. The drum recording surface has portions defining a single track with an associated data entering and data sensing head associated therewith, and other common function portions defined by a plurality of tracks and heads.

As will be more particularly described, all recording and sensing heads assigned to the same transfer path are controlled by the same sensing and recording circuit apparatus which includes a plurality of selectively actuatable head switching means. The signal head switching circuit apparatus selects at any one time only one signal head within its group, but any particular signal head is selectable by more than one signal switching apparatus. Each head is connected to a separate switching means 36–45, with it to be understood that the number of heads and associated switching means have merely been chosen for purposes of explanation and in actuality many more such heads and switching means are required. The letters R and R/W have been used to designate the function of the controlled heads as "read" or sensing and "read/write" or sensing and data entering, respectively.

Still referring to FIG. 3, it is seen that the drum recording surface is delineated into bands or areas having a common function, which areas may consist of a single track or a large number of consecutively adjacent tracks. These bands represent any suitable cyclic storage means such as shift registers, delay lines, or cyclically operated random access memories. Program storage band 46 contains program data which is transferred to storage read/write control 47 via head 26 and switching means 36, which operation is read-only or sense-only as indicated by the letter R. That is, program data of this kind does not require updating and therefore it only has to be read out. Drum storage bands 47, 48, 49 and 50 can receive and read out data stored therein through switching means 37 through 40 to access ports 51, 52, 53 and 54 respectively under control of the storage read/write control 47.

It is to be noted that access to memory bands 48, 49, 50, 55 and 56 for both data entry and data sensing is made available through switching means 44 to port 57. Similarly, switching means 45 interrelate port 58 with storage bands 47, 48, 49, 50, 55 and 56. This capability is additionally referenced on the drawing as multiple storage access arrangements.

The transfer switching means 59 and 60 provide for inter and intra storage data transfer. That is, not only can new information be introduced from peripheral equipment for storage, but by suitable actuation of the switching means 59 and 60, information can be read out of any storage track/s in bands 46–50 and recorded into any other track on the drum. It is important to note that transfer of information from one track or one location on the drum to another can be performed independently of what is occurring at any of the other signal recording and sensing heads.

Program information for the data processor 61 is read out of the program band 56 through the switching means 43. Heads 31 and 32 are provided to supply to and sink data from the processor.

Each of the switching means 36–45, 59 and 60 are provided with enabling signals *a*, *b*, - - - *m* at respectively different times to insure that no sensing or recording head is activated by two or more switching means at the same time.

Figure 4:
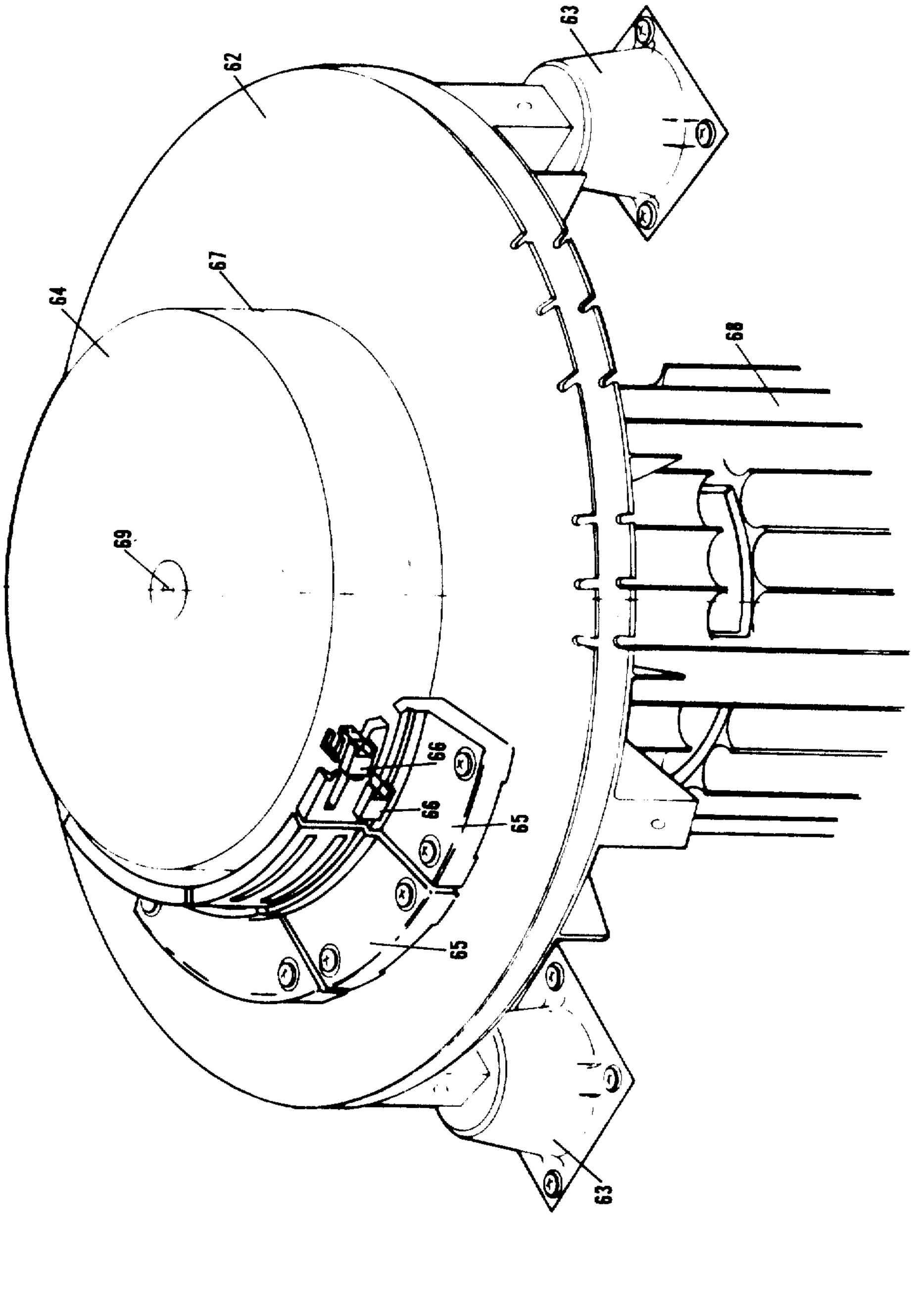
FIG. 4 is a perspective view of a drum memory for use in the system of FIG. 3.

Turning now to FIG. 4, there is shown a typical drum memory for use as the buffer storage medium described above in connection with the system of FIG. 3. Such a memory for satisfactory operation in the subject system must include a sufficient number of sensing and recording heads suitably spaced from one another about the recording surface as to insure freedom from crosstalk. As shown there, a base plate 62 is mounted on shock and vibration absorbers 63 to provide isolation of the spinning drum 64 from external mechanical interference. L-shaped mounting members 65 are affixed to the upper surface of the base plate 62 for carrying heads 66 suitably positioned to sense and record on the circumferential periphery 67 which is provided with a magnetizable recording coating. A rotative power source 68 drives the drum 64 about its axis 69 at a relatively high velocity, e.g., 3,600 rpm or more.

Figure 5:
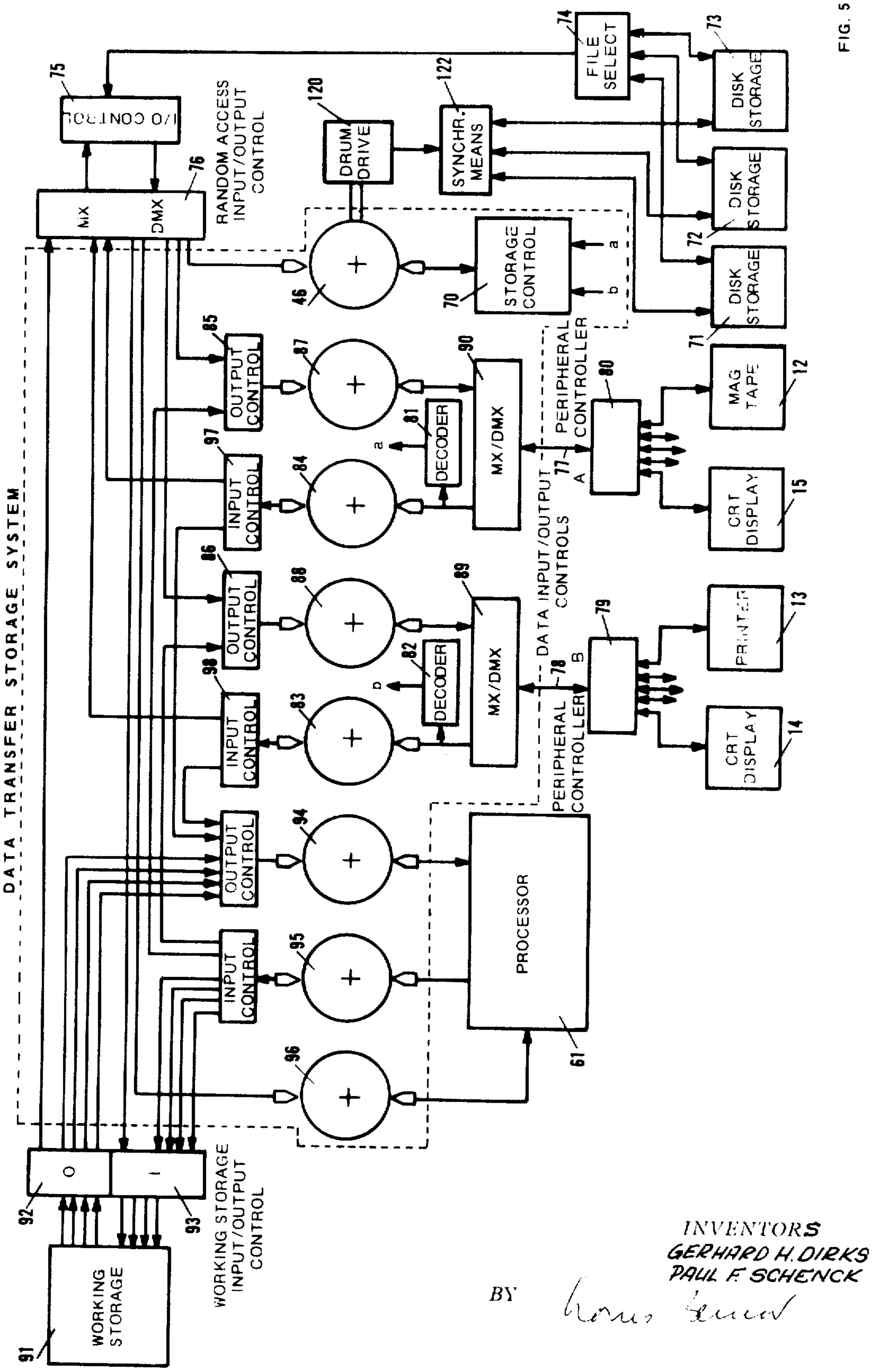
FIG. 5 is a schematic representation of the overall system depicting generalized data flow therethrough.

With reference now to FIG. 5, there is shown operation of the present invention primarily in connection with the use of dedicated storage data. For ease of presentation, a circle has been used to represent a storage band consisting of one or more drum tracks, and sensing and recording heads are depicted as separate entities although typically both functions can be accomplished in a single head appropriately connected to both recording and sense amplifiers.

Basic control for the FIG. 5 circuit is maintained by storage control 70 which has the dedicated storage band 46 of FIG. 3 for temporary storage use. The program storage receives program information from any one of the disk file storage units 71–73 through the file select control 74, file input/output control 75 and distributor DMX 76. Except for initial set up, all of the equipment switching information from one storage location to another is dependent upon the program unit control 70. The unit 70 is also responsive to command signals or request input *a* and *b* as shown and can issue all control signals essential for any proposed data transfer.

In FIG. 5 two input/output channels 77 and 78 are shown, each having its own pair of multiplexer/demultiplexers 80 and 79, respectively, the latter functioning as controller for the peripherals attached to them. That is, peripheral controller 79 controls CRT display 14 and a printer 13; and controller 80 controls a magnetic tape unit 12 and a CRT display 15. The peripherals 12 to 15 are merely exemplary and it is to be understood that the described equipment can accommodate other and different peripherals as well. Upon request by any of the peripheral equipment through decoders 81 and 82, data information may be stored in the set of storage locations 83 or 84 from which data can be transferred under the control of the program unit 70 to disk storages 71–73. The set of locations 83 and 84 are selected tracks within a band such as 48 (FIG. 3) and operate as input temporary or buffer storage.

Data transfer from disk file storages 71–73 to a peripheral is accomplished via file select 74, I/O control 75, distributor 76, and controls 85 and 86 to temporarily store in the set of drum tracks 87 and 88. Transfer of data from tracks 87 and 88 to peripheral displays 12–15 is through multiplexers 89 and 90, respectively, and distributors 79 and 80. Each of the circuit means 74–76, 79, 80, 89 and 90 are bidirectional switching means which perform a data selection function for one transfer direction and as distributors for transfers in the opposite direction.

The arrangement of FIG. 5 can be expanded by adding more ports, each having input and output buffer storage tracks and interconnected with the remainder of the system through a separate port. For batch processing of data carried in a disk storage or so-called working storage 91, accessibility is controlled by the switching means 92 and 93, the latter being further identified as O (output) and I (input), respectively. Any one of the four storage bands of 91 can receive data from or store data in any disk storage 71–73. Moreover, any of the storage bands in 91 can store data in the tracks 87 and 88 for subsequent transfer to a peripheral. Similarly, disk storage 91 can write into drum bands 94 and read out of bands 95. The sets of storage tracks 94 and 95 serve as input and output, respectively, for the processor 61, the stored control program for which is contained in tracks 96.

More particularly, to eliminate delays while the data processor 61 operates on data received from the disk storage files 71–73, the working storage 91 serves as temporary storage for input and output to the processor. In operation, data from one or more of the files 71–73 are transferred to working storage 91 and also to the processor 61. Until processing is complete, no further transfer of data from files 71–73 occurs which makes them available to the other peripherals during time of data processing.

Instant updating of data entered at one of the peripherals is provided via controls 83, 84, 97 and 98. For example, the CRT displays 14 and 15 can be made to instantly indicate any change of data entered via, say, a character printer 16 or phone link 17 (FIG. 1).

The arrangement of which FIG. 5 is a schematic diagram includes synchronizing means 122 for synchronously transferring data between drum storage tracks 46, 83, 84, 87, 88, 94, 95, and 96 and any of the file storages 71, 72, 73. Synchronous transfer of data simplifies the hardware required to interface these rotating memories, and increases efficiency of the system by reducing the time required for data transfer.

Synchronizing means 122 receive signals from drum drive 120 and from the drives of disk storages 71, 72 and 73. By its repetition rate, each signal indicates the rate of rotation of the particular storage device. The time between the occurrence of each signal indicates the time required for the completion of each rotation. Comparison of the repetition rate of the signals from a disk drive (such as 71–73) and drum drive 120 results in an output signal which will keep the relative rates of rotation of the disk drive and drum drive at a fixed ratio with respect to each other. Therefore, after reaching the speed synchronization, a comparison of the time of occurrence of each signal is used to force the disk drive into a fixed angular position relative to the drum drive. A disk storage rotating in synchronization and phase lock with the drum storage performs its functions as if the disk storage were an integral part of the drum storage area. Similar methods (not shown) are used to interface the drum and other peripherals which are capable of operating at the bit rate of the drum storage of the system.

A more detailed description of an arrangement for synchronizing the rotational rates of the disk storages to the drum storage is given below with reference to FIG. 7.

When the cyclic memories are shift registers, delay lines, or cyclically operated random access memories, the synchronizing means is able to individually synchronize such memories to coordinate the transfer of data.

Figure 6:
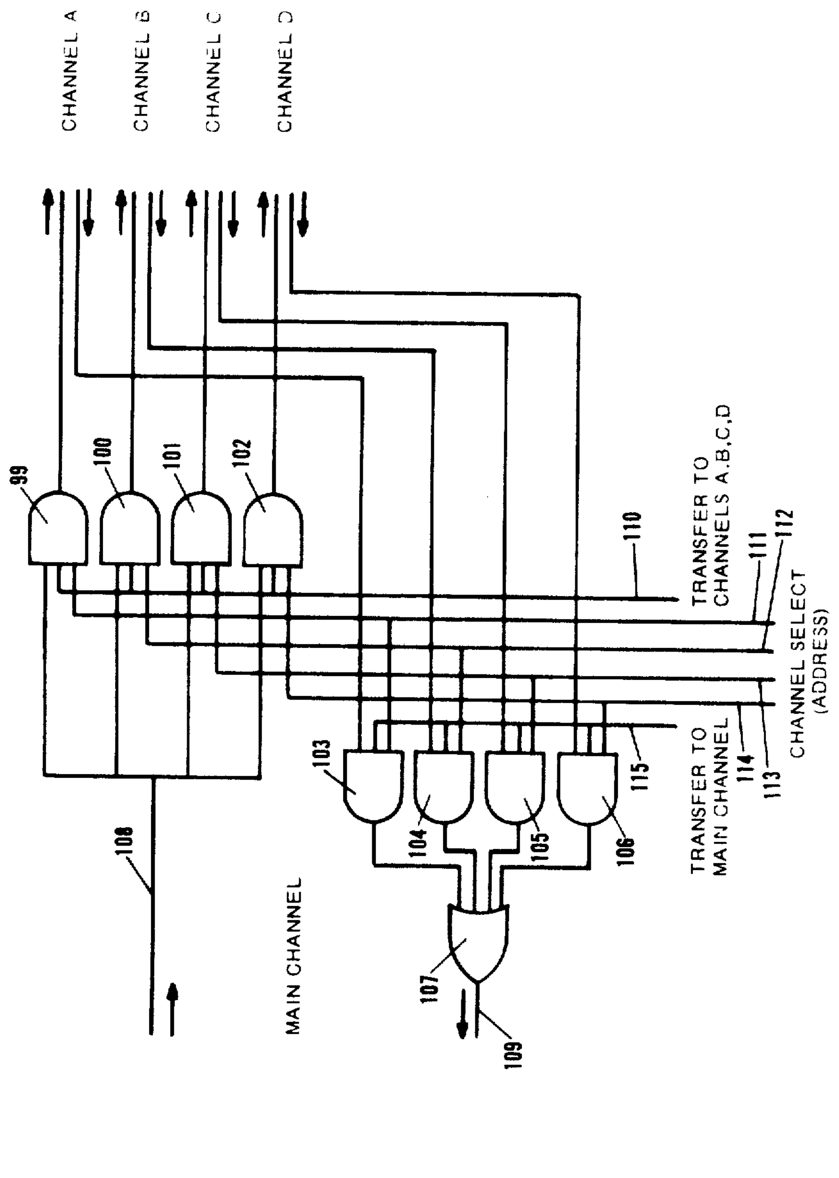
FIG. 6 is a function block circuit diagram of one form of switching means for use in the described system.

Each of the switching circuits or controls identified by the numerals 74–76, 79, 80, 89, and 90 accomplish bidirectional data handling, performing a multiplexing or data selecting function for one direction of data flow and acting as distributors for data flow in the opposite direction. FIG. 6 shows one form of circuit apparatus for use in this connection. The apparatus shown there includes four AND-gates 99–102, a further set of four AND-gates 103–106 and an OR-gate 107, all of which cooperate to provide bidirectional flow of data from any of the four channels A, B, C, or D with respect to the main channel including leads 108 and 109. The direction of data flow is indicated in the drawing by arrows located adjacent each of the various leads.

Data provided on lead 108 serves as an input to each of the AND-gates 99–102, the respective output from which AND-gates is fed individually into channels A, B, C and D. AND-gates 99–102 are all provided with enabling signals via lead 110 which is a general signal to effect transfer to the lettered channels. Further, individual select signals are provided via leads 111–114 to each of the same AND-gates. Therefore, to provide information from main channel lead 108 to, say, channel A, not only must there be a signal on lead 108, but it must be concurrent with an up condition on 110 and 111.

Similarly, the AND-gates 103–106 are activated by signals from each of the channels A, B, C and D as well as appropriate channel select signals and a common input gating pulse on lead 115, the latter generally commanding a transfer to the main channel. Since any of the information being gated via 103–106 is to be sent onto a single lead 109, the outputs of AND-gated 103–106 are OR-gated via 107.

In accordance with the circuit of FIG. 6, any signals present on main channel lead 108 may be selectively fed into any one or collection of channels A, B, C or D by merely energizing the appropriate channel select lead. That is, a multiplexing is achieved in that the signals on 108 can be fed out onto any one or all of four different channels. As to incoming signals on the channels A, B, C and D, these are demultiplexed via AND-gates 103–106 and OR-gate 107 to appear on the single main channel lead 109.

As mentioned above, the speed and phase synchronization of disk and drum rotation is achieved by comparing signals which are generated at the devices which are to be synchronized. More particularly, a signal indicating the speed and phase condition of the drum drive 120 is supplied to synchronizing means 122 via the line 123 (FIG. 7). This signal is in the form of a series of pulses which are fed to a pulse shaper 124. Shaper 124 generates uniform pulses which are integrated in integrator 125. The output signal of the integrator 125 is a dc signal having a voltage level which is proportional, in voltage, to the speed of the drum storage.

Figure 7:
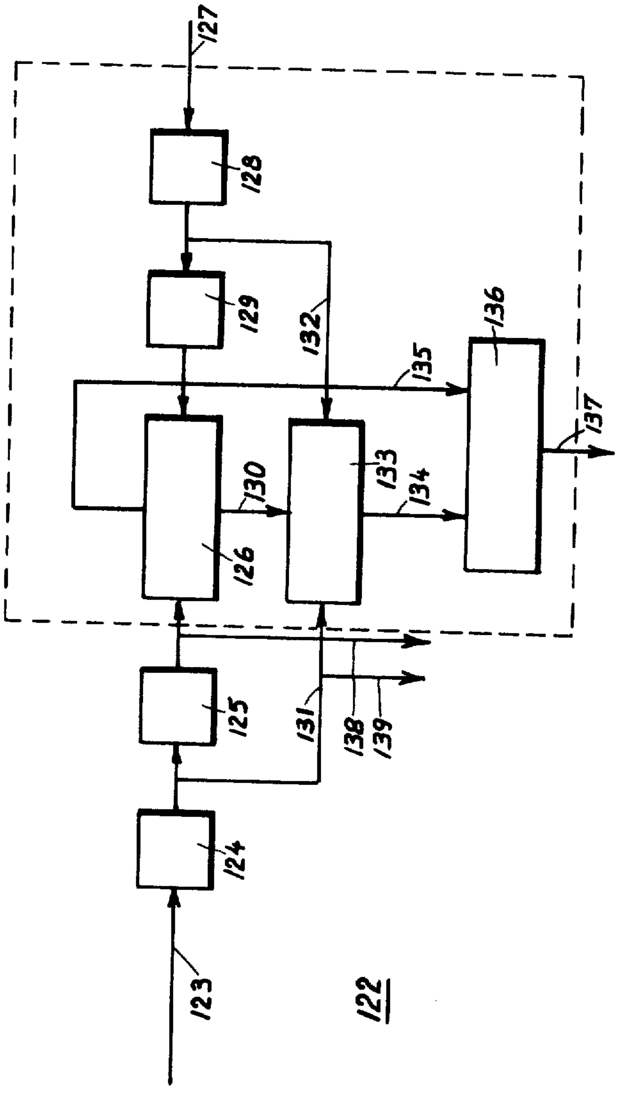
FIG. 7 is a schematic representation of an arrangement for synchronizing rotating memories.

A corresponding pulse signal from a drive associated with one of the disk storages 71, 72, 73 is supplied to the arrangement of FIG. 7 via the line 127. The pulses constituting this signal enter a pulse shaper 128 and are fed from shaper 128 to integrator 129. The dc output signal of integrator 129 has a voltage level which is proportional to the speed of the particular disk drive. Both of these dc signals are supplied from integrator 125 and from integrator 129 to a comparator 126. Responsive thereto, an output signal appears on line 135 with a magnitude which is proportional to the voltage level difference between the input signals. A signal appears on line 130 when there is a match between the voltage levels of both input signals (within a given limit). The differential output signal on line 135 is fed directly into a controlled power supply 136, of the particular disk drive. The output power of of supply 136 increases or decreases the power to the disk drive via the line 137 to increase of decrease the drive speed.

Signals from the pulse shapers 124 and 128 are fed via lines 131 and 132, respectively, into a coincidence circuit 133. This coincidence circuit 133 receives an enable signal as soon as both devices (the drum drive 120 and the particular disk drive) reach speed synchronism. Circuit 133 compares the time of occurrence of the two signal pulses and generates an output pulse on line 134. The magnitude of the generated pulse is proportional to the interval between the occurrence of a pulse on line 131 and a pulse on line 132. These output pulses on line 134 induce the power supply 136 to issue short power pulses on line 137, in addition to the average output level caused by signals on line 135. Responsive to the pulses on line 134, these short power pulses momentarily increase or decrease the speed of the disk drive. The time intervals between the disk and drum pulses appearing on lines 123, 127 are controlled until the deviation from normal is reduced to zero. A coincidence between the pulse signals from drum drive 120 and a particular disk drive indicates an in-phase operation of both devices.

The output lines 138 and 139 provide for connections between the drum drive and other circuitry (similar to the described arrangement of FIG. 7) for controlling other disk drives.

It is to be understood that the arrangement disclosed in FIG. 7 can also be implemented using either linear signal processing means or digital signal processing means.

When disk storage is used, each operates at its own uncontrolled speed. The peripheral device serviced by each storage area supplies the pulse signals required for synchronization via wire 127. The cyclically operating storage means provides speed reference signals on wire 123. Thus, the synchronizing signals on wire 137 may also control other storage devices such as shift registers, delay lines, and cyclically operated random access memories. Depending upon the requirements of such synchronizing, gating circuits such as shown in the bottom half of FIG. 6 may be used. Gates of this type (called "multiplexers") are readily available on the open market and sometimes designated as type 9309 or 9312, preferably made by the Fairchild Company.

What is claimed is:

1. A storage system for storing data, comprising, in combination:
   - data storage means having a plurality of storage areas for storing data;
   - a plurality of storage area access means, each access means being individually associated with a dedicated one of said storage areas;
   - a plurality of transfer means for transferring data between said dedicated areas and a plurality of data entering and utilization means;
   - a plurality of selectively actuatable first switching circuit means interconnecting each of said plurality of dedicated storage area access means with each of said transfer means for effecting concurrent transfer of data between storage areas and data entering and utilization means;
   - at least one selectively actuatable second switching circuit means interconnecting more than one of said plurality of said dedicated storage area access means with one of said plurality of transfer means; and
   - central control means for selectively actuating and individually operating any of said first and second switching means to transfer data from said dedicated areas to said data entering and utilizing means.

2. A storage system for storing data as claimed in claim 1, including selectively actuatable third switching circuit means interconnecting certain of said data storage area access means with certain other of said data storage area access means, and means for actuating said third switching means.

3. A data storage transfer system as in claim 1, in which said first and second switching circuit means include buffer storage means and further means for controlling said buffer storage means.

4. A data storage transfer system as in claim 2, in which said third switching circuit means include buffer storage means and further means for controlling said buffer storage means.

5. A storage system as claimed in claim 1, wherein certain of said transfer means include intermediate storage means for storing data; first circuit means interconnecting one of said first and second switching means with said intermediate storage means; second circuit means interconnecting said intermediate storage means with said data entering and data utilization means; said first circuit means operating at a first transfer rate during transfers of data between said intermediate storage means and said first switching means; said second circuit means operating at a second transfer rate during transfers of data between said intermediate storage means and said data entering and data utilization means; said intermediate storage means adapted to operate selectively at said first and said second transfer rate.

6. Data transfer apparatus, comprising:
   - a plurality of different peripheral types of data input devices;
   - a plurality of data utilization devices;
   - storage means having a plurality of different dedicated data storage locations;
   - separate data storing and sensing means associated with each said dedicated storage location for storing and for sensing stored data in the respective dedicated location according to the type of peripheral;
   - selectively actuatable first switching means individually connected with each data storing and sensing means for placing the same in an active condition when activated;
   - a plurality of terminals connected with said data input and utilization devices on a one-to-one basis;
   - first circuit means interconnecting certain of said terminals with certain data storing and sensing means;
   - second switching circuit means interconnecting at least one of said terminals with at least two of said data storing and sensing means; and
   - means connected with said first and second switching means for substantially simultaneously actuating a predetermined group of said switching means.

7. Data transfer apparatus as in claim 6 and the data processing means coupled to said data storage means for processing said stored data.

8. Data transfer apparatus as in claim 7 and data phone means also coupled to said data storage means for transmitting said stored data to a distant location.

9. Data transfer apparatus as in claim 6, in which one of said data utilization devices includes a cathode ray tube; and means interconnected therewith for providing a repetitive display of data being entered, stored, and sensed in a given group of storage locations.

10. Data transfer apparatus as in claim 9 in which said storage means are cyclically operating storage means.

11. Data transfer apparatus as in claim 10, in which said storage means includes a rotating magnetic memory.

12. Data transfer apparatus as in claim 6, in which said selectively actuatable switching means include a plurality of movable mechanical supports each carrying one of said data storing and sensing means; and means for controlling the movement of each of said supports to bring said storing and sensing means in operative proximity with a prescribed storage area of said storage.

13. A data transfer system for accommodating a plurality of different types of data generating and data utilizing peripheral equipments, each type of equipment having its own distinctive input/output characteristics comprising:
   - data storage means having a plurality of different storage locations;
   - means associated with said storage means for storing and sensing data in said storage means including means for sensing data in each location, means for recording data in each location; and a plurality of different terminal means having associated buffer storage means, each terminal serving as a data port for a particular type of associated peripheral equipment;

first switching circuit means interconnecting at least one of said terminal means and the recording and sensing means of a buffer storage means for thereafter providing selective access to transfer the data between said buffer storage means and any storage location in said storage means;

second switching circuit means interconnecting other terminal means to predetermined groups of storage locations in said storage means;

third switching circuit means interconnecting certain of said sensing means with certain of said recording means, whereby data sensed by said certain sensing means are stored elsewhere in the storage means via said certain recording means; and means controlling said first and second switching circuit means for recording and sensing data simultaneously and without recourse to time sharing via at least two different ports.

14. A storage transfer system as in claim 13, in which at least certain of said peripheral equipment have different data generating and data utilizing rates from said other peripheral equipment.

15. A storage transfer system as in claim 13, in which said first and second switching circuit means include bidirectional data transfer circuits.

16. A storage system for storing data comprising in combination:

a cyclically operated data storage means having a plurality of individually effective storage areas for storing data;

a plurality of storage area access means, each one being associated with one of said storage areas;

a plurality of transfer means for transferring data between a plurality of said storage areas and data entering or utilization means;

a plurality of controlled first switching circuit means interconnecting certain of said plurality of said storage area access means with certain of said transfer means for concurrent transfer of data between different storage areas and different data entering and data utilization means;

at least one controlled second switching circuit means interconnecting more than one of said plurality of storage area access means with one of said plurality of transfer means; and means for controlling said plurality of first and second switching means.

17. A storage system for storing data as claimed in claim 16 including controlled third switching circuit means interconnecting certain of said plurality of data storage area access means with certain other of said data storage area access means; and means for controlling said third switching means.

18. A data storage transfer system as in claim 16, in which said controlled first and second switching circuit means include buffer storage means and further means for controlling said buffer storage means.

19. A data storage transfer system as in claim 18, in which said controlled third switching circuit means include buffer storage means and further means for controlling said buffer storage means.

20. Data transfer apparatus comprising:

a plurality of peripheral data input devices having different "language" characteristics;

a plurality of data utilization devices;

storage means having a plurality of different data storage locations;

data storing and sensing means associated with each said storage location for storing and for sensing stored data in the respectively associated locations;

selectively actuatable first switching means individually connected with said data storing and sensing means for placing the same in an active condition when activated;

a plurality of first terminals for connecting said input devices to said utilization devices on a one-to-one basis;

a plurality of second terminals connected with said data utilization devices on a one-to-one basis;

first circuit means interconnecting certain of said first terminals with certain data storing and sensing means;

means connected with said first and second switching means for actuating a predetermined group thereof; and second circuit means interconnecting at least one of said second terminals with at least two of said data storing and sensing means.

21. Data transfer apparatus as in claim 19, in which one of said data utilization devices includes a cathode ray tube; and means are interconnected therewith for providing a repetitive display of data being entered and data being sensed in a given group of storage locations.

22. Data transfer apparatus as in claim 20, in which said storage means includes a rotating magnetic memory.

23. A storage system as claimed in claim 16 wherein certain of said transfer means include intermediate storage means for storing data;

first circuit means interconnecting one of said first and second switching means with said intermediate storage means;

second circuit means interconnecting said intermediate storage means with said data entering or utilization means; said first circuit means operating at a first transfer rate during transfers of data between said intermediate storage means and said first switching means; said second circuit means operating at a second transfer rate during transfers of data between said intermediate storage means and said data entering or utilization means; said intermediate storage means adapted to operate selectively at said first and said second transfer rate.

24. A data transfer system for accommodating a plurality of different types of data generating and data utilizing peripheral equipment, comprising:

data storage means having a plurality of different storage locations dedicated to said equipment according to the types thereof;

means associated with said storage means for storing and sensing data in said storage means including: means for sensing data in each dedicated location; means for recording data in each dedicated location;

a plurality of different terminal means, each serving as a data port for individually associated peripheral equipment;

first switching circuit means interconnecting at least one of said terminal means and the recording and sensing means providing selective access to any storage location in said storage means;

second switching circuit means interconnecting other terminal means to predetermined groups of storage locations in said storage means;

third switching circuit means interconnecting said means for sensing data with said means for recording data, whereby data sensed by said means for sensing data are directly stored elsewhere in said storage means; and means controlling said first and second switching circuit means for recording and sensing data simultaneously at least at two different ports.

25. A storage transfer system as in claim 24 in which at least certain of said peripheral equipment have different data generating and data utilizing rates from said other peripheral equipment.

26. A storage transfer system as in claim 24, in which said first and second switching circuit means include bidirectional data transfer circuits.

27. A front-end data transfer apparatus for a computer comprising in combination:

a plurality of data input devices;

a plurality of data utilization devices;

first data storage means for storing data having a plurality of storage locations;

a first data port interconnecting certain of said storage locations with the input/output channel of said computer;

a plurality of second data ports each interconnecting one of said storage locations with said data input and utilization devices on a one-by-one basis;

second storage means;

a third data port interconnecting certain others of said first data storage means with said second data storage means;

fourth and fifth data port, said fourth data port connected to one or more of said storage locations, said fifth data port interconnecting said fourth data port with others of said storage locations for transfer of data from one of said storage locations to another one; and control means for controlling said first to fifth ports.

28. A front-end data transfer apparatus as in claim 27 in which said first to fifth data ports include intermediate storage means and means for transferring data from and to one of said data entering and utilization means at a different rate as during transfers between a respective one of said intermediate storage means.

29. A front-end data transfer apparatus as in claim 27 in which said first data storage means include rotating magnetic memory.

* * * * *